(12) United States Patent
Hara et al.

(10) Patent No.: US 8,158,841 B2
(45) Date of Patent: Apr. 17, 2012

(54) HYDROTREATING METHOD

(75) Inventors: Hiroaki Hara, Satte (JP); Toshio Shimizu, Satte (JP); Yutaka Miyata, Satte (JP)

(73) Assignees: Japan Oil, Gas and Metals National Corporation, Kanagawa (JP); Japan Petroleum Exploration Co., Ltd., Tokyo (JP); Cosmo Oil Co., Ltd., Tokyo (JP); Nippon Steel Engineering Corporation, Tokyo (JP); Inpex Corporation, Tokyo (JP)

( * ) Notice: Subject to any disclaimer, the term of this patent is extended or adjusted under 35 U.S.C. 154(b) by 637 days.

(21) Appl. No.: 11/631,794

(22) PCT Filed: Sep. 22, 2005

(86) PCT No.: PCT/JP2005/017521
§ 371 (c)(1),
(2), (4) Date: Jan. 8, 2007

(87) PCT Pub. No.: WO2007/034555
PCT Pub. Date: Mar. 29, 2007

(65) Prior Publication Data
US 2009/0005626 A1    Jan. 1, 2009

(51) Int. Cl.
*C07C 1/00* (2006.01)

(52) U.S. Cl. ........ 585/752; 518/728; 502/305; 502/307; 208/58; 208/59; 208/89; 208/254 H; 208/254 R; 208/263; 208/264

(58) Field of Classification Search .............. 208/254 H, 208/254 R, 263, 264, 58, 59, 89; 518/728; 585/752; 502/305, 307
See application file for complete search history.

(56) References Cited

U.S. PATENT DOCUMENTS

| | | | | |
|---|---|---|---|---|
| 2,770,578 A | * | 11/1956 | Haensel | 208/99 |
| 5,059,574 A | * | 10/1991 | Abrevaya | 502/261 |
| 6,294,079 B1 | * | 9/2001 | Thakkar et al. | 208/59 |
| 6,436,870 B1 | * | 8/2002 | Iijima et al. | 502/305 |
| 2002/0128331 A1 | * | 9/2002 | Rosenbaum et al. | 518/728 |

FOREIGN PATENT DOCUMENTS

| | | |
|---|---|---|
| JP | 02-067396 A | 3/1990 |
| JP | 06-158058 A | 6/1994 |
| JP | 07-228876 A | 8/1995 |
| JP | 2000-345171 A | 12/2000 |
| JP | 2001-146592 A | 5/2001 |
| JP | 2001-198471 A | 7/2001 |
| JP | 2002-523231 A | 7/2002 |
| JP | 2005-514516 A2 | 5/2005 |
| JP | 2005-272731 A | 10/2005 |
| WO | 02/34862 A1 | 5/2002 |
| WO | 02/055634 A1 | 7/2002 |

OTHER PUBLICATIONS

Japanese Office Action dated May 21, 2008.
Japanese Office Action dated Aug. 13, 2008.

* cited by examiner

*Primary Examiner* — Prem C Singh
(74) *Attorney, Agent, or Firm* — Sughrue Mion, PLLC

(57) ABSTRACT

To provide a method for hydrotreating a synthetic hydrocarbon oil, which removes olefins and oxygen-containing compounds by hydrotreatment with the gasification rate restrained and can efficiently convert the synthetic hydrocarbon oil generated by the FT process to a liquid fuel suitable as a fuel for diesel-powered vehicles. A hydrotreating method is disclosed in which a synthetic hydrocarbon oil generated by FT synthesis is hydrotreated using a catalyst in which a definite catalytic metal is allowed to be carried on a support, under definite reaction conditions, with the gasification rate restrained to a definite value or less, thereby removing the olefins and the oxygen-containing compounds.

7 Claims, No Drawings

HYDROTREATING METHOD

TECHNICAL FIELD

The present invention relates to a method for hydrotreating a paraffinic synthetic fuel generated by a reaction of carbon monoxide and hydrogen, the so-called Fischer-Tropsch (FT) synthesis.

BACKGROUND ART

Crude oil-derived kerosene-gas oil distillate fractions generally contain sulfur compounds. When these oils are used as a fuel for diesel-powered vehicles, sulfur which exists in the sulfur compounds is converted to low molecular weight sulfur compounds, and exhausted in the air. Further, in an exhaust gas treatment apparatus which is recently being introduced, when the sulfur compound exists in the fuel, there is a fear of poisoning of a catalyst used. Furthermore, aromatic compounds are contained in the crude oil-derived kerosene-gas oil distillate fractions, and there are many reports that particulate matter (PM) and nitrogen oxides ($No_x$) increase when the aromatic content is large. Accordingly, the fuel oil for diesel-powered vehicles is preferably one which is small in sulfur content and aromatic content.

On the other hand, in a synthetic hydrocarbon oil generated by the Fischer-Tropshch synthesis (hereinafter also referred to as the FT process) using a mixed gas comprising carbon monoxide and hydrogen, no sulfur compound is contained, because impurities in the mixed gas are removed. Further, paraffin is contained as a main component, so that the aromatic compounds are scarcely contained. Accordingly, the synthetic hydrocarbon oil by the FT process can be said to be a suitable fuel as a fuel for diesel-powered vehicles.

However, the synthetic fuel generated by the FT process comprises normal paraffin as a main component, but contains olefins and oxygen-containing compounds more or less. These substances are generally not contained in the crude oil-derived kerosene-gas oil distillate fractions. When the olefins are contained in large amounts in an automotive fuel, a peroxide is formed to possibly cause the occurrence of clogging in a fuel filter or the like. Further, even if the oxygen-containing compounds are only slightly contained, it contributes to corrosion of a fuel tank or a fuel supply system. Accordingly, in order to use the synthetic hydrocarbon oil generated by the FT process as the automotive fuel, it is necessary to remove the olefins and the oxygen-containing compounds.

It has hitherto been proposed to hydrotreat the synthetic hydrocarbon oil generated by the FT process, using a hydrogenation catalyst under conditions where isomerization and cracking do not occur, thereby removing the olefin and the oxygen-containing compound (for example, see patent document 1).

Patent Document 1: European Patent Application Publication No. 0583836

DISCLOSURE OF THE INVENTION

Problems to be Solved by the Invention

As described above, in order to use the synthetic hydrocarbon oil generated by the FT process as the automotive fuel, it is necessary to remove olefins and oxygen-containing compounds. Conventional methods known as methods for removing these compounds by hydrotreatment have the problem of a high gasification rate in removing the olefins and the oxygen-containing compounds. Further, the removal rates of the olefins and the oxygen-containing compounds are also insufficient.

Under such an actual situation as described above, an object of the invention is to provide a method for hydrotreating the synthetic hydrocarbon oil, which removes the olefin and the oxygen-containing compound by hydrotreatment with the gasification rate restrained and can efficiently convert the synthetic hydrocarbon oil generated by the FT process to a liquid fuel suitable as a fuel for diesel-powered vehicles.

Means for Solving the Problems

The present inventors have made a series of studies in order to achieve the above-mentioned object. As a result, it has been found that when a synthetic hydrocarbon oil generated by the FT process is hydrotreated under specific reaction conditions using a certain type of catalyst, the gasification rate is restrained and the olefin and the oxygen-containing compound can be removed. Thus, the invention has been completed.

That is to say, in order to achieve the above-mentioned object, the invention provides the following hydrotreating methods.

(1) A hydrotreating method wherein a synthetic hydrocarbon oil generated by Fischer-Tropsch synthesis and containing 50% or more by mass of normal paraffin having 4 to 100 carbon number, 0.01% or more by mass of oxygen-containing compounds, by the oxygen mass ratio on an anhydrous basis, and 0.1% or more by mass of olefins are treated, using a catalyst in which at least one kind selected from nickel, manganese, cobalt, copper, iron and a platinum group metal is contained on a support comprising at least one kind selected from an inorganic oxide, an inorganic crystalline compound and a clay mineral in an amount of 0.1 to 80% by mass, in terms of metal, on a catalyst basis, under conditions of a hydrogen partial pressure of 0.1 to 20 MPa, a temperature of 150 to 300° C., a liquid hourly space velocity of 0.1 to 3 $h^{-1}$, a hydrogen/oil ratio of 50 to 2000 L/L and a gasification rate of 10% or less by mass, thereby removing the olefins and the oxygen-containing compounds.

(2) A hydrotreating method wherein a synthetic hydrocarbon oil generated by Fischer-Tropsch synthesis is treated, using a catalyst in which at least one kind selected from nickel, platinum and palladium is contained on a support comprising at least one kind selected from diatomaceous earth, silica-magnesia and activated carbon in an amount of 0.1 to 80% by mass, in terms of metal, on a catalyst basis, under conditions of a hydrogen partial pressure of 0.1 to 20 MPa, a temperature of 150 to 300° C., a liquid hourly space velocity of 0.1 to 3 $h^{-1}$, a hydrogen/oil ratio of 50 to 2000 L/L and a gasification rate of 10% or less by mass, thereby removing the olefins and the oxygen-containing compounds.

Effect of the Invention

According to the invention, the olefins and the oxygen-containing compounds can be completely removed from the synthetic hydrocarbon oil generated by the FT process with the gasification rate restrained, and a liquid fuel suitable for diesel-powered vehicles can be efficiently obtained.

BEST MODE FOR CARRYING OUT THE INVENTION

The invention is described in detail below.

As described above, the invention is characterized in that a synthetic hydrocarbon oil generated by the FT process is hydrotreated under specific reaction conditions using a certain type of catalyst.

The catalysts used in the invention include one which comprises at least one kind of metal selected from nickel, manganese, cobalt, copper, iron and a platinum group metal, and a support comprising one or more kinds selected from an inorganic oxide and an inorganic crystalline compound or a clay mineral.

As the supports of the inorganic oxides, there can be used various ones, which include, for example, silica, alumina, boria, magnesia, titania, silica-magnesia, silica-zirconia, silica-thoria, silica-beryllia, silica-titania, silica-boria, alumina-zirconia, alumina-titania, alumina-boria, alumina-chromina, titania-zirconia, silica-alumina-thoria, silica-alumina-zirconia, silica-alumina-magnesia and silica-magnesia-zirconia. Above all, silica-magnesia, alumina, silica-alumina, alumina-boria, alumina-titania and alumina-zirconia are preferred, and particularly, of the alumina, γ-alumina is preferred.

Further, as the supports of the inorganic crystalline compounds or the clay minerals, there can also be used various ones, which include, for example, zeolite, diatomaceous earth, activated carbon, molecular sieves and other inorganic crystalline compounds, and clay minerals such as montmorillonite, kaolin, bentonite, attapulgite, bauxite, kaolinite, nakhlite and anoxite.

The above-mentioned various supports can be used either alone or as a combination of two or more thereof. Further, of the above-mentioned various supports, diatomaceous earth and activated carbon are particularly preferred.

Further, the specific surface area and pore volume of the above-mentioned various supports are not particularly limited in the invention. However, in order to obtain the catalyst having excellent hydrogenation activity, the specific surface area is preferably 100 $m^2$/g or more, and the pore volume is preferably from 0.1 to 1.0 mL/g.

Further, the metal as an active component allowed to be supported on the support is at least one kind selected from nickel, manganese, cobalt, copper, iron and a platinum group metal, and preferred one is nickel, platinum and palladium. These metals can be used either alone or as a combination of two or more thereof.

The content of these metals in the catalyst used in the invention is from 0.1 to 80% by mass, in terms of metal, on a catalyst basis. Less than 0.1% by mass results in a reduction in activity, which causes a reduction in the removal rates of the olefin and the oxygen-containing compound. Conversely, exceeding 80% by mass results in a decrease in the specific surface area and pore volume of the support, which causes a reduction in activity.

These metals have the difference in catalytic activity depending on the metal species, so that the content is preferably optimized within the above-mentioned content range for each of metal species. That is to say, for nickel, manganese, cobalt, copper and iron, the content is preferably from 10 to 80% by mass, and more preferably from 45 to 75% by mass, in terms of metal, on a catalyst base. Although the platinum group metal has activity even at a relatively low content, the content is preferably from 0.1 to 10% by mass. Less than 0.1% by mass results in too low activity. Further, the platinum group metal is expensive, so that the content is preferably 10% or less by mass also for avoiding a cost rise.

A method for allowing the support to contain the above-mentioned metal compound, that is to say, a method for preparing the catalyst used in the invention, can be performed by using some known techniques.

One method thereof includes an impregnation method which allows the above-mentioned support to contact a solution obtained by dissolving the above-mentioned metal compounds in a solvent such as water, alcohol, ether or ketone, by one or more impregnation treatments. Drying and calcination are performed after the impregnation treatment. When the plurality of impregnation treatments are performed, drying and calcination may be performed between the respective impregnation treatments.

Another method includes a spray method in which a solution obtained by dissolving the above-mentioned metal compounds is sprayed on the above-mentioned support, or a chemical vapor deposition method which allows the above-mentioned metal components to be chemically deposited.

Still another method includes a kneading method which allows the above-mentioned support component before molding to contain all or a part of the above-mentioned metal component, a coprecipitation method and an alkoxide method.

The physical properties such as the specific surface area and the pore volume of the catalyst prepared by the various methods as described above and used in the invention are not particularly limited in the invention. However, in order to obtain the catalyst having excellent hydrogenation activity, it is preferred that the specific surface area is 100 $m^2$/g or more, and that the pore volume is from 0.05 to 1.2 mL/g.

The catalyst used in the invention can be used in powder form, in granular form, in spherical form, in pellet form, in honeycomb form or in any other form, without regard to the form and structure thereof. However, it is desirable to select the form according to the type of a reactor. When the reactor is a fixed bed, a molded article is generally used. Further, when the catalyst is molded to use, a binder of an organic or inorganic compound or the like, a caking agent or the like may be used, within the range not impairing the effect of the invention.

As for hydrotreating conditions in the invention, the hydrogen partial pressure is from 0.1 to 20 MPa, preferably from 0.2 to 10 MPa, the temperature is from 150 to 300° C., preferably from 160 to 240° C., the liquid hourly space velocity is from 0.1 to 3 $h^{-1}$, preferably from 0.5 to 2 $h^{-1}$, and the hydrogen/oil ratio as 50 to 2000 L/L, preferably from 50 to 1000 L/L.

When the hydrogen partial pressure is less than 0.1 MPa, hydrogenation activity is excessively reduced. Exceeding 20 MPa requires high-cost equipment which can withstand such a high pressure, resulting in bad economy. When the temperature is less than 150° C., catalytic activity is excessively reduced. Exceeding 300° C. accelerates the decomposition of the raw oil, resulting in an increase in the gasification rate. When the liquid hourly space velocity is less than 0.1 $h^{-1}$, processing efficiency is reduced. Exceeding 3 $h^{-1}$ excessively shortens the contact time of the catalyst and a raw oil, resulting in failure to fully develop catalytic activity.

It is preferred that the above-mentioned hydrogenating conditions are optimized depending on the kind of active metal or support of the catalyst. In particular, the temperature is desirably within the following range, depending on the kind of active metal or support of the catalyst.

Ni-diatomaceous earth catalyst: 150 to 250° C., preferably 180 to 240° C., and more preferably 200 to 220° C.

Pt-alumina catalyst: 180 to 240° C., preferably 190 to 230° C., and more preferably 200 to 220° C.

Pd-alumina catalyst: 180 to 240° C., preferably 190 to 230° C., and more preferably 200 to 220° C.

Ni-silica-magnesia catalyst: 150 to 200° C., preferably 150 to 180° C., and more preferably 150 to 170° C.

Pd-activated carbon catalyst: 180 to 240° C., preferably 190 to 230° C., and more preferably 200 to 220° C.

Further, in the invention, the gasification rate is controlled to 10% or less by mass. The controlling of the gasification rate to 10% or less by mass can be achieved by appropriately adjusting and optimizing hydrotreating conditions such as the hydrogen partial pressure, the temperature, the liquid hourly space velocity and the hydrogen/oil ratio within the above-mentioned respective ranges, or appropriately adjusting the composition of the synthetic hydrocarbon oil generated by the FT process which is used as the raw oil.

An oil to be processed (raw oil) in the invention is a synthetic hydrocarbon oil which is generated by the FT synthesis and requires the removal of the oxygen-containing compounds and the olefins.

As the raw oil, for example, one obtained as a single lot may be used alone, or one obtained as a plurality of lots may be used as a mixture thereof. Further, one obtained using a definite catalyst under definite reaction conditions may be used alone, or a plurality of ones obtained using different catalysts under different reaction conditions may be used as a mixture thereof.

As the raw oil of the invention, it is preferred that normal paraffin having preferably 4 or more carbon number and more preferably 7 or more carbon number is contained as a main component, because an increase in the gasification rate caused by the cracking of the raw oil is easily restrained to increase the yield after the hydrotreatment.

In particular, as the raw oil of the invention, there is suitable a synthetic hydrocarbon oil generated by the FT synthesis and containing 50% or more by mass of normal paraffin having 7 to 100 carbon number, 0.01% or more by mass of oxygen-containing compounds, by the oxygen mass ratio on an anhydrous basis, and 0.1% or more by mass of olefins. The controlling of the carbon number of the normal paraffin in the raw oil to 100 or less is preferred because clogging in a pump, a line or the like for raw material supply caused by rising in melting point of the raw oil is easily prevented. The paraffin having carbon number exceeding 100 in the raw oil is desirably less than the lower limit detectable with a gas chromatograph or less (less than about 0.1% by mass).

The contents of the oxygen-containing compounds and the olefins in the synthetic hydrocarbon oil generated by the FT synthesis are largely different depending on an FT catalyst. For an Fe-based catalyst and a Ru-based catalyst, the oxygen-containing compounds amount to 3% or more by mass, by the oxygen mass ratio, and the olefins content amount to 50% or more by mass, in some cases. However, for a Co-based catalyst which has been most frequently studied, generally, the oxygen-containing compounds are 3% or less by mass, by the oxygen mass ratio, and the olefins are to 10% or less by mass. In the invention, when the raw oil containing the oxygen-containing compounds and the olefins in these ranges is used, the effect of the invention is effectively exhibited. Even when the olefins content is 50% or more by mass, the effect of the invention is effectively exhibited.

Further, production efficiency can be increased and a cost rise can be avoided, as the contents of the oxygen-containing compounds and the olefins in the raw oil are low. It is therefore also preferred that these compounds be previously removed from the raw oil to a definite degree, thereby controlling the oxygen-containing compounds to 2% or less by mass, by the oxygen mass ratio, and the olefins to 7% or less by mass. In particular, it is desirable that the content of alcohol is generally not so high, such as 5% or less by mass.

When the invention is carried out on a commercial scale, what is necessary is just to load the catalyst to a fixed bed, a moving bed or a fluidized bed in an appropriate reactor, to introduce the above-mentioned raw oil into this reactor, and to perform the treatment under the above-mentioned hydrotreating conditions. Most generally, the above-mentioned catalyst is maintained as the fixed bed, and the raw oil is allowed to pass downward through the fixed bed.

In carrying out on a commercial scale, a single reactor may be used, or two or more continuous reactors can also be used.

When the single reactor is used, two or more different catalysts can also be filled in the reactor to perform the reaction. In this case, the inside of the reactor is divided, and the different catalysts can be dividedly filled in each layer, or the catalysts can also be mixed and filled. When the two or more continuous reactors are used, the different catalysts can also be used in the respective reactors.

Further, an analyzing apparatus for detecting the olefins and the oxygen-containing compounds is installed on the downstream side from the reactor, and when these are detected, leading the effluents from the reactor to the upstream side is carried out, and the hydrotreatment can be performed again.

EXAMPLES

The present invention will be illustrated in greater detail with reference to the following examples and comparative examples, but the invention should not be construed as being limited to the following examples.

Example 1

Using a catalyst in which nickel was contained on a support of diatomaceous earth shown in Table 1 in an amount of 50% by mass, in terms of metal, on a catalyst basis, and using as a raw material raw material 1 shown in Table 3, a hydrotreating reaction was conducted under conditions of Table 2 at a reaction temperature of 200° C., and activity evaluation was carried out. The evaluation results are shown in Table 4.

Here, activity evaluation was carried out as follows. That is to say, a raw oil was supplied to an upstanding cylindrical fixed bed flow type reactor downward from a top thereof. For the size of the reactor, the internal diameter was 12 mm (internal diameter: 3 mm), and a catalyst of 18 mL was filled. Prior to reaction evaluation, a pretreatment reduction was performed under a hydrogen flow at 200° C. for 2 hours, using a heater with which the reactor was equipped. In that case, the hydrogen flow rate is 50 mL/min, and the hydrogen partial pressure is 3.0 MPa. The reaction was conducted controlling the reaction temperature by setting of the heater, the reaction pressure with a pressure-regulating valve, and the hydrogen/oil ratio with a mass flow controller, respectively. A two-stage trap for collecting the reaction product was provided downstream from the fixed bed flow type reactor. The first stage was kept at ordinary temperature, and the second stage was cooled with ice water. The heavy fraction and the light fraction were each collected in the respective stages.

The alcohol residual rate, aldehyde residual rate, carboxylic acid rate and olefin residual rate in Table 4 were determined as follows. First, distributions of alcohols, aldehydes, carboxylic acids and olefins were qualitatively examined with gas chromatography, and a substance having the highest peak was selected for each. Each category was represented thereby. Here, $C_7H_{15}OH$ was selected as a representative of the alcohols, $C_9H_{10}CHO$ as a representative of the aldehydes, $C_9H_{19}COOH$ as a representative of the carboxylic acids, and $C_7H_{14}$ as a representative of the olefins. Then, normal hexane having purity of 99.9% was measured with an infrared spectroscopic analyzer, and it was confirmed that no alcohol, no aldehyde, no carboxylic acid and no olefin were detected. There were prepared samples in which the respective representative substances were mixed with this normal hexane in amounts of 1% by mass, 3% by mass, 5% by mass, 10% by mass, 30% by mass and 70% by mass, respectively, and the samples were analyzed with an infrared spectroscopic analyzer, followed by drawing calibration curves. The products collected in the activity evaluation were analyzed with an infrared spectroscopic analyzer, the alcohol residual rate, aldehyde residual rate, carboxylic acid rate and olefin residual rate were measured and converted by the respective calibration curves.

The gasification rate shown in Table 4 was defined as the percent by mass of the gaseous products collected based on the mass of the raw material supplied in the activity evaluation.

TABLE 1

| Support | Diatomaceous Earth | Alumina | Alumina | Silica-Magnesia | Activated Carbon |
|---|---|---|---|---|---|
| ICP-Pt (mass %) | 0.0 | 0.0 | 0.5 | 0.0 | 0.0 |
| ICP-Pd (mass %) | 0.0 | 0.5 | 0.0 | 0.0 | 0.5 |
| ICP-Ni (mass %) | 50 | 0 | 0 | 70 | 0 |
| Catalyst BET Specific Surface Area ($m^2$/g) | 120 | 150 | 150 | 200 | 1000 |
| Catalyst Pore Volume (mL/g) | 0.12 | 0.35 | 0.35 | 0.25 | 0.55 |

Note:
In Table 1, ICP is an abbreviation of "Inductively Coupled Plasma" (emission spectrochemical analysis).

TABLE 2

| Reaction Pressure | 3 MPa |
|---|---|
| Liquid hourly space velocity | 1.0 $h^{-1}$ |
| Hydrogen/Oil Ratio | 156 L/L |
| Apparatus | High-Pressure Fixed Bed Flow Reactor |

TABLE 3

| | Alcohol In Terms of $C_7H_{15}OH$ | Aldehyde In Terms of $C_9H_{19}CHO$ | Carboxylic Acid In Terms of $C_9H_{19}COOH$ | Olefin In Terms of $C_7H_{14}$ |
|---|---|---|---|---|
| | | | | Unit [mass %] |
| Raw Material 1 | 3.8 | 2.6 | 0.4 | 7.4 |
| Raw Material 2 | 4.2 | 0.2 | 0.1 | 4.7 |

* Raw Materials 1 and 2 are synthetic hydrocarbon oils obtained by the FT synthesis in the boiling point range of 30 to 360° C.

Example 2

Activity evaluation was carried out in the same manner as in Example 1 with the exception that the reaction temperature was changed to 220° C. The evaluation results are shown in Table 4.

Example 3

Activity evaluation was carried out in the same manner as in Example 1 with the exception that the reaction temperature was changed to 180° C. The evaluation results are shown in Table 4.

Example 4

Activity evaluation was carried out in the same manner as in Example 1 with the exception that the reaction pressure was changed to 2 MPa. The evaluation results are shown in Table 4.

Example 5

Activity evaluation was carried out in the same manner as in Example 1 with the exception that the reaction pressure was changed to 1 MPa. The evaluation results are shown in Table 4.

Example 6

Activity evaluation was carried out in the same manner as in Example 1 with the exception that the reaction pressure was changed to 0.5 MPa. The evaluation results are shown in Table 4.

Example 7

Activity evaluation was carried out in the same manner as in Example 1 with the exception that the reaction pressure was changed to 0.2 MPa. The evaluation results are shown in Table 4.

Example 8

Activity evaluation was carried out in the same manner as in Example 1 with the exception that the liquid hourly space velocity was changed to 2.0 $h^{-1}$ and that the hydrogen/oil ratio was changed to 78 L/L. The evaluation results are shown in Table 4.

Example 9

Activity evaluation was carried out in the same manner as in Example 8 with the exception that the reaction temperature was changed to 220° C. The evaluation results are shown in Table 4.

Example 10

Activity evaluation was carried out in the same manner as in Example 8 with the exception that the reaction temperature was changed to 240° C. The evaluation results are shown in Table 4.

Example 11

Activity evaluation was carried out in the same manner as in Example 1 with the exception that the liquid hourly space velocity was changed to 0.5 h$^{-1}$ and that the hydrogen/oil ratio was changed to 312 L/L. The evaluation results are shown in Table 4.

Example 12

Activity evaluation was carried out in the same manner as in Example 11 with the exception that the reaction temperature was changed to 180° C. The evaluation results are shown in Table 4.

Example 13

Activity evaluation was carried out in the same manner as in Example 1 with the exception that the raw material was changed to raw material 2 shown in Table 3. The evaluation results are shown in Table 4.

Example 14

Using a catalyst in which nickel was contained on a support of silica-magnesia shown in Table 1 in an amount of 70% by mass, in terms of metal, on a catalyst basis, and using as a raw material raw material 1 shown in Table 3, a hydrotreating reaction was conducted under conditions of Table 2 at a reaction temperature of 200° C., and activity evaluation was carried out. The evaluation results are shown in Table 4.

Example 15

Using a catalyst in which palladium was contained on a support of alumina shown in Table 1 in an amount of 0.5% by mass, in terms of metal, on a catalyst basis, and using as a raw material raw material 1 shown in Table 3, a hydrotreating reaction was conducted at a reaction pressure of 3 MPa, at a liquid hourly space velocity of 0.3 h$^{-1}$, at a hydrogen/oil ratio of 520 L/L, at a reaction temperature of 200° C., and activity evaluation was carried out. The evaluation results are shown in Table 4.

Example 16

Using a catalyst in which palladium was contained on a support of activated carbon shown in Table 1 in an amount of 0.5% by mass, in terms of metal, on a catalyst basis, and using as a raw material raw material 1 shown in Table 3, a hydrotreating reaction was conducted at a reaction pressure of 3 MPa, at a liquid hourly space velocity of 0.3 h$^{-1}$, at a hydrogen/oil ratio of 520 L/L, at a reaction temperature of 200° C., and activity evaluation was carried out. The evaluation results are shown in Table 4.

Example 17

Using a catalyst in which platinum was contained on a support of alumina shown in Table 1 in an amount of 0.5% by mass, in terms of metal, on a catalyst basis, and using as a raw material raw material 1 shown in Table 3, a hydrotreating reaction was conducted at a reaction pressure of 3 MPa, at a liquid hourly space velocity of 0.3 h$^{-1}$, at a hydrogen/oil ratio of 520 L/L, at a reaction temperature of 200° C., and activity evaluation was carried out. The evaluation results are shown in Table 4.

Comparative Example 1

Activity evaluation was carried out in the same manner as in Example 14 with the exception that the reaction temperature was changed to 140° C. The evaluation results are shown in Table 4. Under these conditions, the alcohol of 2.5% by mass and the aldehyde of 0.1% by mass remained.

Comparative Example 2

Activity evaluation was carried out in the same manner as in Example 1 with the exception that the reaction temperature was changed to 240° C. The evaluation results are shown in Table 4. Under these conditions, the oxygen-containing compounds and the olefins could be completely removed, but a loss by gasification exceeded 10% by mass.

Comparative Example 3

Activity evaluation was carried out in the same manner as in Example 1 with the exception that the liquid hourly space velocity was changed to 4.0 h$^{-1}$ and that the hydrogen/oil ratio was changed to 39 L/L. The evaluation results are shown in Table 4. Under these conditions, the alcohol of 0.7% by mass remained.

Comparative Example 4

Activity evaluation was carried out in the same manner as in Example 1 with the exception that the hydrogen/oil ratio was changed to 16 L/L. The evaluation results are shown in Table 4. Under these conditions, the alcohol of 0.7% by mass remained.

Comparative Example 5

Activity evaluation was carried out in the same manner as in Example 1 with the exception that the reaction pressure was changed to 0.05 MPa. The evaluation results are shown in Table 4. Under these conditions, the alcohol of 0.8% by mass remained.

TABLE 4

| | Alcohol In Terms of $C_7H_{15}OH$ | Aldehyde In Terms of $C_9H_{19}CHO$ | Carboxylic Acid In Terms of $C_9H_{19}COOH$ | Olefin In Terms of $C_7H_{14}$ | Gasification Rate |
|---|---|---|---|---|---|
| | | | | | Unit [mass %] |
| Example 1 | 0.0 | 0.0 | 0.0 | 0.0 | 0.0 |
| Example 2 | 0.0 | 0.0 | 0.0 | 0.0 | 5.0 |
| Example 3 | 0.3 | 0.1 | 0.0 | 0.0 | 0.0 |
| Example 4 | 0.0 | 0.0 | 0.0 | 0.0 | 0.0 |
| Example 5 | 0.0 | 0.0 | 0.0 | 0.0 | 0.0 |
| Example 6 | 0.0 | 0.0 | 0.0 | 0.0 | 0.0 |
| Example 7 | 0.0 | 0.0 | 0.0 | 0.0 | 0.0 |
| Example 8 | 0.2 | 0.0 | 0.0 | 0.0 | 0.0 |
| Example 9 | 0.2 | 0.0 | 0.0 | 0.0 | 3.6 |
| Example 10 | 0.2 | 0.0 | 0.0 | 0.0 | 8.5 |
| Example 11 | 0.0 | 0.0 | 0.0 | 0.0 | 0.7 |
| Example 12 | 0.0 | 0.0 | 0.0 | 0.0 | 0.0 |
| Example 13 | 0.0 | 0.0 | 0.0 | 0.0 | 0.5 |
| Example 14 | 0.0 | 0.0 | 0.0 | 0.0 | 8.0 |
| Example 15 | 0.2 | 0.0 | 0.0 | 0.0 | 8.7 |
| Example 16 | 0.2 | 0.0 | 0.0 | 0.0 | 6.5 |
| Example 17 | 0.0 | 0.0 | 0.0 | 0.0 | 8.2 |
| Comparative Example 1 | 2.5 | 0.1 | 0.0 | 0.0 | 7.3 |
| Comparative Example 2 | 0.0 | 0.0 | 0.0 | 0.0 | 10.9 |
| Comparative Example 3 | 0.6 | 0.0 | 0.0 | 0.0 | 0.0 |
| Comparative Example 4 | 0.7 | 0.0 | 0.0 | 0.0 | 0.0 |
| Comparative | 0.8 | 0.0 | 0.0 | 0.0 | 0.0 |

TABLE 4-continued

| | | | | Unit [mass %] |
|---|---|---|---|---|
| Alcohol In Terms of $C_7H_{15}OH$ | Aldehyde In Terms of $C_9H_{19}CHO$ | Carboxylic Acid In Terms of $C_9H_{19}COOH$ | Olefin In Terms of $C_7H_{14}$ | Gasification Rate |

Example 5

Although the invention has been described in detail with reference to specific embodiments, it will be apparent to those skilled in the art that various changes and modifications are possible without departing from the spirit and scope of the invention.

The invention is based on Japanese Patent Application (JP 2004-090425) filed on Mar. 25, 2004, the whole of which is incorporated herein by reference.

INDUSTRIAL APPLICABILITY

According to the invention, the olefin and the oxygen-containing compound can be completely removed from a synthetic oil generated by the FT process with the gasification rate restrained, and a liquid fuel suitable as a fuel for diesel-powered vehicles can be efficiently obtained.

The invention claimed is:

1. A hydrotreating method, wherein a synthetic hydrocarbon oil generated by Fischer-Tropsch synthesis and containing 50% or more by mass of normal paraffin having 4 to 100 carbon number, 0.01% or more by mass of oxygen-containing compounds, by the oxygen mass ratio on an anhydrous basis, and 0.1% or more by mass of olefins and having a boiling point range of 30 to 360° C. is treated, using a catalyst in which nickel and optionally one or both of platinum and palladium are contained on a support comprising diatomaceous earth and optionally one or more of silica-magnesia, alumina and activated carbon, wherein the catalyst has a specific surface area of 100 m²/g or more, and a pore volume of from 0.05 to 1.2 mL/g under conditions of a hydrogen partial pressure of 0.1 to 20 MPa, a liquid hourly space velocity of 0.1 to 3 h⁻¹, a hydrogen/oil ratio of 50 to 2000 L/L and a gasification rate of 10% or less by mass, thereby removing the olefin and the oxygen-containing compound, wherein the nickel is contained in the support in an amount of 45-75% by mass, in terms of metal, on a catalyst basis, and the synthetic hydrocarbon oil is treated at a temperature from 150 to 250° C.

2. The hydrotreating method according to claim 1, wherein the support comprises alumina in addition to diatomaceous earth, and platinum is contained on the support in addition to nickel.

3. The hydrotreating method according to claim 1, wherein the support comprises alumina in addition to diatomaceous earth, and palladium is contained on the support in addition to nickel.

4. The hydrotreating method according to claim 1, wherein the support comprises silica-magnesia in addition to diatomaceous earth, and the synthetic hydrocarbon oil is treated at a temperature from 150 to 200° C.

5. The hydrotreating method according to claim 1, wherein the support comprises activated carbon in addition to diatomaceous earth, and palladium is contained on the support in addition to nickel.

6. The hydrotreating method according to claim 1, wherein platinum is contained on the support in addition to nickel, the platinum is contained in the support in an amount from 0.1-10% by mass, in terms of metal, on a catalyst basis, and the synthetic hydrocarbon oil is treated at a temperature from 180 to 240° C.

7. The hydrotreating method according to claim 1, wherein palladium is contained on the support in addition to nickel, the palladium is contained in the support in an amount of 0.1-10% by mass, in terms of metal, on a catalyst basis, and the synthetic hydrocarbon oil is treated at a temperature from 180 to 240° C.

* * * * *